(12) United States Patent
Chung et al.

(10) Patent No.: US 6,642,982 B2
(45) Date of Patent: Nov. 4, 2003

(54) LIQUID CRYSTAL DISPLAY DEVICE WITH ORIENTATION FILM HAVING PROJECTING EDGE PORTIONS AND MANUFACTURING METHOD OF THE SAME

(75) Inventors: In-Jae Chung, Kyongsangbuk-do (KR); Ki-Bok Park, Inchon-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 199 days.

(21) Appl. No.: 09/965,843

(22) Filed: Oct. 1, 2001

(65) Prior Publication Data

US 2002/0071078 A1 Jun. 13, 2002

(30) Foreign Application Priority Data

Dec. 8, 2000 (KR) .......................................... 2000-74512

(51) Int. Cl.⁷ ...................... G02F 1/1337; G02F 1/1339
(52) U.S. Cl. ........................................ 349/123; 349/153
(58) Field of Search ................................. 349/123, 126, 349/153

(56) References Cited

U.S. PATENT DOCUMENTS 5,680,189 A * 10/1997 Shimizu et al. ............. 349/123
5,706,069 A * 1/1998 Hermens et al. ............ 349/153
5,929,959 A 7/1999 Iida et al. ................... 349/154

\* cited by examiner

Primary Examiner—Robert H. Kim
Assistant Examiner—Andrew Schechter
(74) Attorney, Agent, or Firm—Morgan, Lewis & Bockius LLP

(57) ABSTRACT

A liquid crystal display device includes first and second substrates, an orientation film on at least one of the first and second substrates, the orientation film having projecting edge portions extending at least in part beyond an outer contour of an active area, a seal material along the outer contour of the orientation film at a regularly-spaced interval from the orientation film, and a liquid crystal layer between the first and second substrates.

21 Claims, 3 Drawing Sheets

LIQUID CRYSTAL DISPLAY DEVICE WITH ORIENTATION FILM HAVING PROJECTING EDGE PORTIONS AND MANUFACTURING METHOD OF THE SAME

The present invention claims the benefit of Korean Patent Application No. P2000-74512 filed in Korea on Dec. 8, 2000, which is hereby incorporated by reference in its entirety.

BACKGROUND OF THE INVENTION

1. Field of the Invention

The present invention relates to a display device, and more particularly, to a liquid crystal display device and a manufacturing method of the same.

2. Description of the Related Art

The manufacture of a TFT-LCD (Thin Film Transistor-Liquid Crystal Display) panel may be divided into: (1) a TFT array process for forming switching elements to apply signals to a pixel unit; (2) a color filter process to generate different colors; and, (3) a liquid crystal cell process for providing a driving circuit on a TFT substrate and a color filter substrate to manufacture a unit liquid crystal cell that is capable of signal driving.

The entire liquid crystal cell process may be subdivided into: (1) an orientation film forming process; (2) a cell gap forming process, and (3) a liquid crystal injection and polarizing film adhering process. The orientation film forming process will be described hereinafter in detail.

The orientation film forming process includes a polymer thin film forming and rubbing step, and a polymer thin film cleaning step. All of these steps require techniques for forming a polymer thin film of a predetermined thickness and for rubbing the whole substrate uniformly. Such a process forms a uniform orientation of liquid crystal molecules, thereby providing uniform display properties. A macroscopic coefficient of physical properties of the liquid crystal molecules is based on their alignment state such that their response to external forces, such as an electric field, changes.

Generally, since the TFT-LCD implements a TN (Twisted Nematic) mode that uses a horizontal orientation, a rubbing method using an organic orientation film is widely used. For the organic orientation film, a polymer compound of a polyimide group has been widely used because of its stability, durability and productivity of the required orientation. A polyimide solution uses polyamic acid or polyimide, which is a monomer before reacting with a solvent, dissolved in a low concentration of about 4~8%.

The orientation film used in an active matrix liquid crystal display device should preferably form a film at a temperature less than 200° C. and have excellent adhesive properties with Indium Tin Oxide (ITO). It is important that during the orientation film coating process a wide area of the orientation film is coated uniformly and evenly. A preferred thickness of the orientation film is about 500~1000 Å. Since spots may be formed of a thickness difference of about 100 Å, thickness adjustment of the orientation film is an important factor in the orientation film coating process. To spread the orientation film uniformly and evenly, and to evaporate the solvent, a prebaker may be used. If the evaporation speed of the solvent is too fast, the polyimide material may dry before it can be spread uniformly, thereby forming spots of different thicknesses. The substrate to be prebaked is inserted into a hardening furnace, and the orientation film is prehardened in the hardening furnace, thereby forming a polyimide orientation film.

The rubbing step involves rubbing the orientation film in a prescribed direction using a rubbing fabric. Accordingly, if the polyimide orientation film is rubbed, the liquid crystal molecules are aligned in the rubbing direction. The rubbing fabric may include a cloth in which cotton fiber or nylon group fiber is implanted. The rubbing step includes a simple rubbing apparatus that includes a roller. One of the most fundamental parameters required for the rubbing process is to select a moderate, uniformly applied rubbing force over a large area to be rubbed. An alignment level between the liquid crystal molecules and the rubbing strength linearly increases initially, but as the rubbing force increases a saturation state is reached. Additionally, if the rubbing force is not uniform, the alignment level of the liquid crystal molecules is not fixed in space, thereby causing a non-uniformity error resulting in locally different optical characteristics.

Hereinafter, referring to the drawings, a liquid crystal display panel according to the prior art will be described in detail.

FIG. 1 is a sectional view of a conventional liquid crystal display panel, and FIG. 2 is a plan view of FIG. 1.

In FIGS. 1 and 2, a TFT (Thin Film Transistor) lower substrate 1 includes a plurality of data lines and gate lines (not shown) intersecting one another on the insulated substrate board where a plurality of TFTs (not shown) are formed at each intersection for switching signals applied to the liquid crystal. The area where the data lines, the gate lines and the TFTs are formed is defined as an active area 12. A thin organic orientation film 13 is coated on the substrate including the active area 12 to orient the liquid crystal. A color filter upper substrate 14 includes light shielding layers (not shown) and color filter layers of R, G and B (not shown). The light shielding layers are formed on the insulated substrate to prevent transmission of light to the data lines, the gate lines and the TFTs. The color filter layers are formed on a space between the light shielding layers to provide color representation. Like the lower substrate 11, the upper substrate 14 has an orientation film (not shown). Moreover, liquid crystal molecules 15 aligned in accordance with an electric signal are inserted and sealed between the upper substrate 14 and the lower substrate 11. A material for sealing the liquid crystals is formed along a seal line 16.

In the structure of the conventional liquid crystal display device, the orientation film is disposed within the active area and is formed along the contour of the active area. The rubbing process starts from an edge of the liquid crystal display device (see FIG. 2). Then, the orientation film is processed during the prebaking step and a baking step both at about 100° C. for hardening the orientation film.

However, the conventional liquid crystal display device has the following problems. Because polyimide is an organic material and is used as the orientation film, heat contraction from the contour to the inside of the active area 12 may occur during the prebaking and baking steps. However, since the orientation film is formed along the rectangular contour of the active area 12, the heat contraction in a heat contraction direction 17 (see FIG. 3) on an edge portion of the orientation film is not uniform. Moreover, since the heat contraction along the shorter side and edge portions of the rectanglar contour is more severe than the heat contraction along the longer sides of the rectangular contour, the orientation of the liquid crystal molecules is distorted during the rubbing process of the orientation film. Furthermore, in a Twisted Nematic (TN) mode, a rubbing angle of 45 degrees or 135 degrees is generally performed. With this rubbing angle, the edge portions of the orientation film make contact first with the rubbing roll, thereby creating spots of different thicknesses. These spots will be displayed the liquid crystal display screen, thereby reducing the quality of the displayed images.

SUMMARY OF THE INVENTION

Accordingly, the present invention is directed to a liquid crystal display device and a manufacturing method of the same that substantially obviates one or more of the problems due to limitations and disadvantages of the related art.

An object of the present invention is to provide a liquid crystal display device that is capable of rubbing an orientation film in a uniform direction by changing a coated area of an orientation film.

Additional features and advantages of the invention will be set forth in the description which follows, and in part will be apparent from the description, or may be learned by practice of the invention. The objective and other advantages of the invention will be realized and attained by the structure and method particularly pointed out in the written description and claims hereof as well as the appended drawings.

To achieve these and other advantages and in accordance with the purpose of the present invention, as broadly embodied and broadly described, a liquid crystal display device first and second substrates, an orientation film on at least one of the first and second substrates, the orientation film having projecting edge portions extending at least in part beyond an outer contour of an active area, a seal material along the outer contour of the orientation film at a regularly-spaced interval from the orientation film, and a liquid crystal layer between the first and second substrates.

In another aspect of the present invention, a manufacturing method of a liquid crystal display device includes forming an orientation film on at least one of first and second substrates, the orientation film having projecting edge portions extending at least in part beyond an outer contour of an active area, forming a seal material on one of the first and second substrates along the outer contour of the orientation film at a regularly-spaced interval from the orientation film, and forming a liquid crystal layer between the first and second substrates.

In another aspect of the present invention, a liquid crystal display device includes first and second substrates, an active area on the first substrate including a plurality of gate lines and data lines, switching devices at intersections of the gate lines and the data lines, and pixel electrodes connected to the switching devices, the orientation film having projecting edge portions extending at least in part beyond an outer contour of an active area, at least one seal material regularly-spaced along the outer contour of the orientation film, and a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
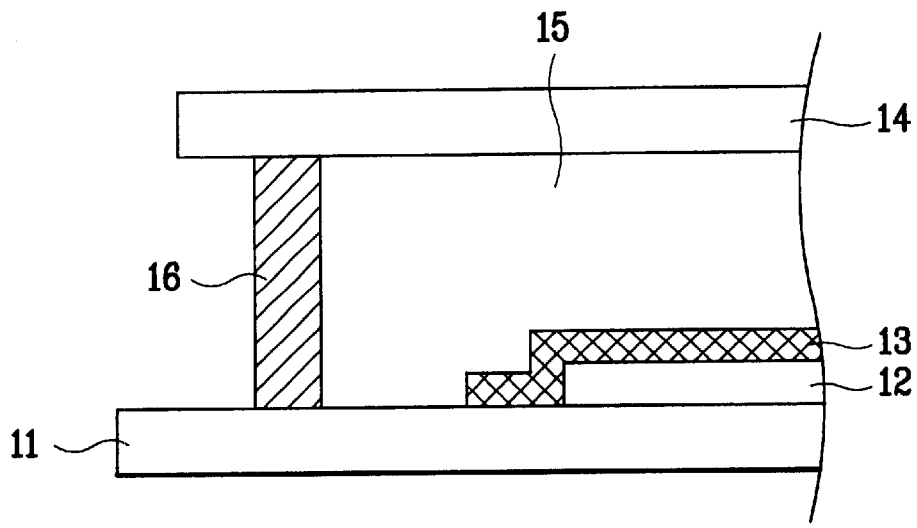
FIG. 1 is a sectional view of a conventional liquid crystal display device.
Figure 2:
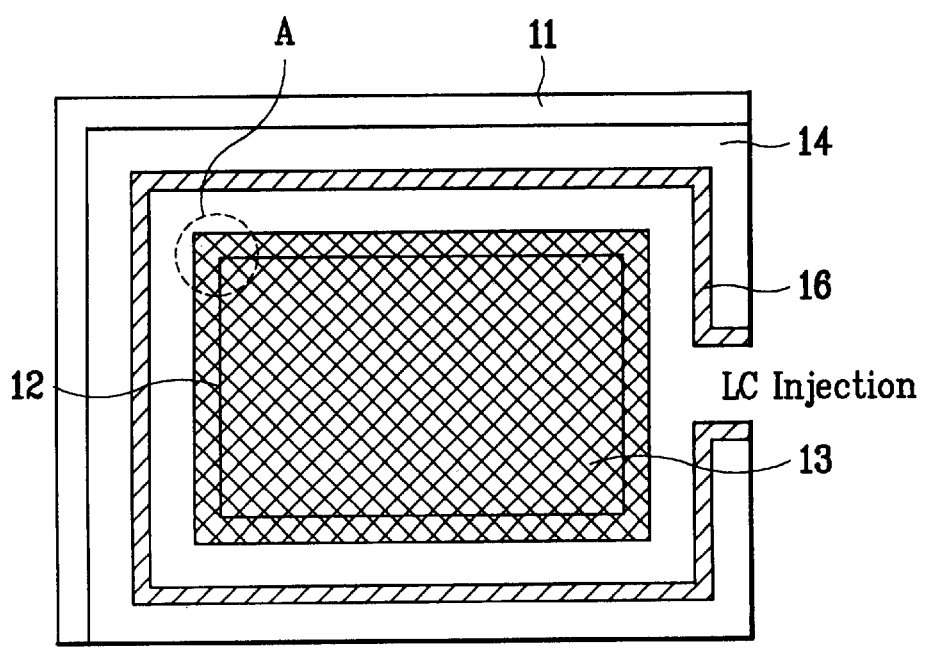
FIG. 2 is a plan view of FIG. 1.
Figure 3:
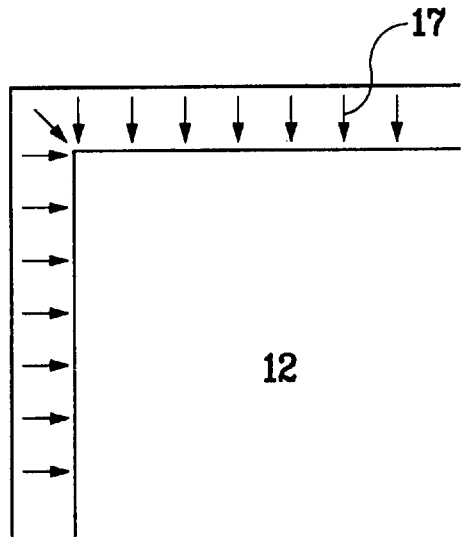
FIG. 3 is an enlarged plan view of a portion taken along the portion A of FIG. 2.
Figure 4:
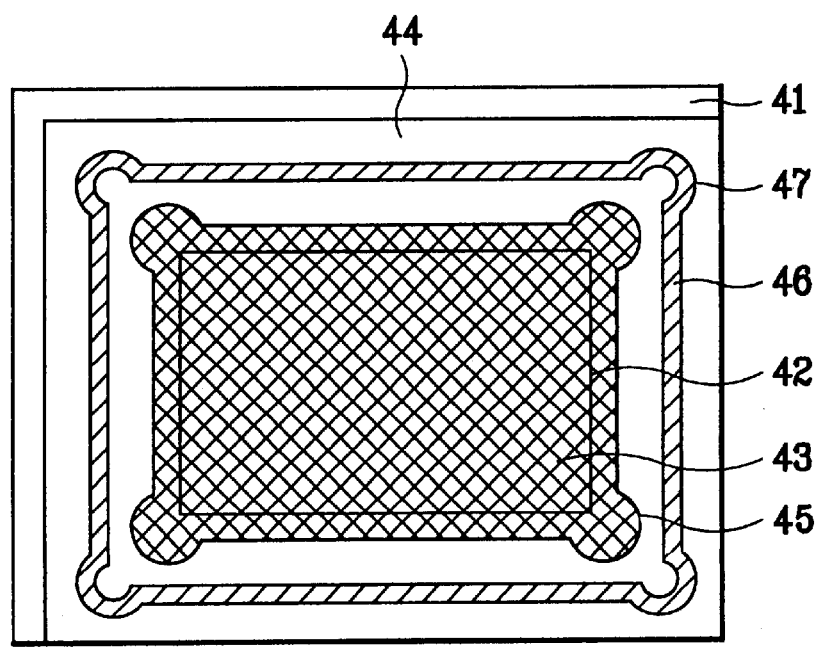
FIG. 4 is a plan view of an exemplary liquid crystal display device according to the present invention.

In FIG. 4, an exemplary liquid crystal display device according to the present invention includes a first substrate 41 and a second substrate 44 having an active area 42, and liquid crystal layer (not shown) sealed between the first substrate 41 and the second substrate 44 by a sealing material. An orientation film 43 is coated on a contoured portion of the active area 42 and may be formed of a polyimide material. The area of the orientation film 43 coated on the second substrate 44 is approximately the same as an area of the orientation film 43 coated on the first substrate 41. The shape of the orientation film 43 may differ according to the shape and/or location in the liquid crystal display panel. In the present example, a rectangular liquid crystal display panel is shown. However, other shapes and sizes may be used. Additionally, the location of the orientation film 43 may be changed within the liquid crystal display panel. A side portion of the rectangular-shaped orientation film 43 is disposed to be parallel with the active area, but each edge portion of the lower substrate 41 is coated with the orientation film to a thickness greater than a thickness at the side portion. Additionally, sealing material of a prescribed thickness is formed at a regularly-spaced interval from the orientation film along a seal line 46.

Figure 5A:
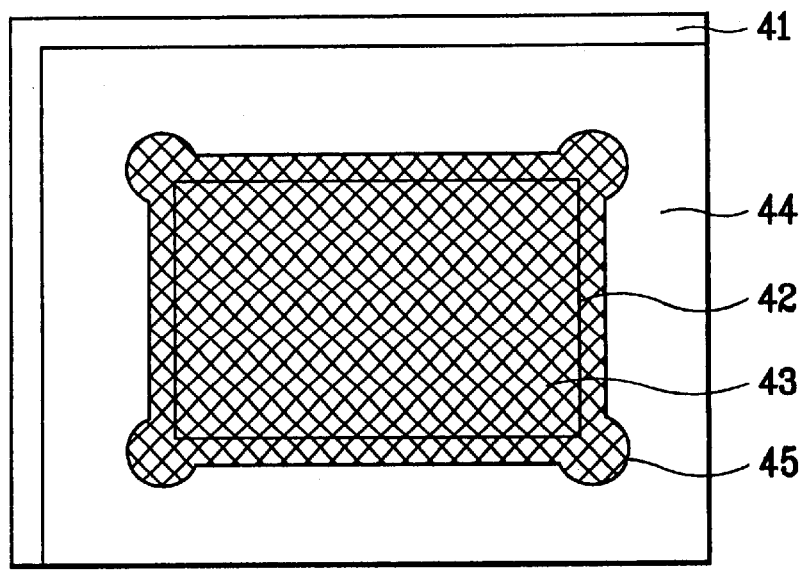
FIGS. 5A and 5B are plan views showing an exemplary manufacturing method of a liquid crystal display device according to the present invention.
Figure 5B:
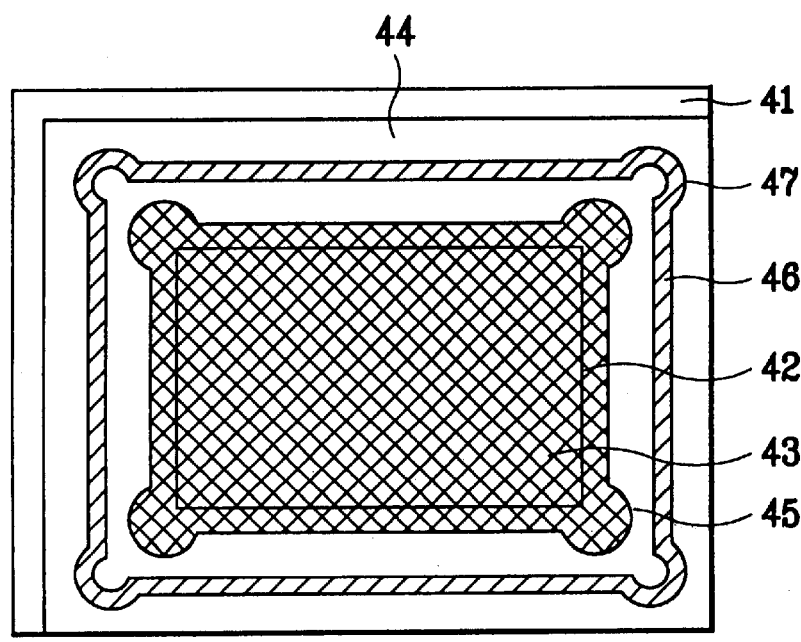

FIGS. 5A and 5B are plan views showing an exemplary manufacturing method of the liquid crystal display device in accordance with the present invention.

As shown in FIG. 5A, the orientation film 43 is coated on a prescribed area of a first substrate 41 within an active area contour including the active area 42 and projecting edge portions 45. Then, the orientation film 43 is dried at a temperature less than about 200 degrees, and a rubbing process is performed beginning from an edge portion of the substrate to impart directional properties to the orientation film. Although not shown, the first substrate includes gate lines and data lines, and switching devices, such as thin film transistors, disposed at intersections between the gate and data lines. And, the second substrate includes a color filter layer. Additionally, the first substrate includes pixel electrodes connected to the switching devices and a color filter layer disposed on the first substrate and the pixel electrodes. Also, a color filter layer may be formed on the switching devices and a pixel electrode may be formed on the color filter layer. Moreover, the first substrate may include a color filter layer, a plurality of gate and data lines, thin film transistors disposed at interections of the gate and date lines, and pixel electrodes connected to the thin film transistors.

The orientation film 43 may be formed of a polyimide group material, for example, or polyamide and polyamic acid may be used. The orientation film 43 may also be formed on an area of a second substrate 44 similar to the orientation film area formed on the first substrate 41. Alternatively, the second substrate may not be coated with the orientation film.

As shown in FIG. 5B, a seal material 46 may be formed on the first and second substrates 41 and 44 at a regularly-spaced interval along an outer contour of the orientation film 43 and includes projecting edge portions 47. Accordingly, a liquid crystal layer is injected and sealed between the first and second substrates 41 and 44. The liquid crystal layer may be formed using a vacuum injection method by capillary action or using a dispenser method without injection. In the case of the dispenser method, the liquid crystal layer can be applied or dispensed without a need for a liquid crystal injection hole. Moreover, the seal material may be formed of a single bead, as shown, or of equally-spaced double beads and may have thermohardening or photohardening properties.

The exemplary liquid crystal display device according to the present invention may also be applied to other modes of the liquid crystal display device including Vertical Alignment (VA), In-Plane Switching (IPS), Poly-Si, Optically Controlled Birefringence (OCB) and Ferroelectric Liquid Crystal (FLC) modes.

It will be apparent to those skilled in the art that various modifications and variations can be made in the liquid crystal display device and manufacturing method of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    first and second substrates;
    an orientation film on at least one of the first and second substrates, the orientation film having projecting edge portions extending at least in part beyond an outer contour of an active area;
    a seal material along the outer contour of the orientation film at a regularly-spaced interval from the orientation film; and
    a liquid crystal layer between the first and second substrates.

2. The device according to claim 1, wherein the orientation film covers the active area.

3. The device according to claim 1, wherein the seal material has projecting edge portions.

4. The device according to claim 1, wherein the orientation film includes polyimide material.

5. The device of claim 1, further comprising:
    a plurality of gate lines and data lines arranged on the first substrate;
    switching devices disposed at intersections of the gate lines and the date lines;
    pixel electrodes connected to the switching devices; and
    a color filter layer on the second substrate.

6. The device according to claim 5, wherein the switching devices include a thin film transistor.

7. The device according to claim 1, further comprising:
    a plurality of gate lines and data lines disposed on the first substrate;
    switching devices disposed at intersections of the gate lines and the date lines;
    a color filter layer on the switching devices; and
    pixel electrodes connected to the switching devices.

8. The device according to claim 7, wherein the switching device includes a thin film transistor.

9. The device according to claim 1, further comprising:
    a color filter layer on the first substrate;
    a plurality of gate lines and data lines on the color filter layer;
    switching devices at intersections of the gate lines and the data lines; and
    pixel electrodes connected to the switching devices.

10. The device according to claim 9, wherein the switching devices includes a thin film transistor.

11. A method for manufacturing a liquid crystal display device, the method comprising:
    forming an orientation film on at least one of first and second substrates, the orientation film having projecting edge portions extending at least in part beyond an outer contour of an active area;
    forming a seal material on one of the first and second substrates along the outer contour of the orientation film at a regularly-spaced interval from the orientation film; and
    forming a liquid crystal layer between the first and second substrates.

12. The method according to claim 11, wherein the orientation film includes polyimide material.

13. The method according to claim 11, wherein the orientation film covers the active area.

14. The method according to claim 11, further including the step of rubbing of the orientation film.

15. The method according to claim 14, wherein the rubbing step begins at an edge portion of the substrate.

16. The method according to claim 11, further comprising:
    forming a plurality of gate lines and data lines on the first substrate;
    forming thin film transistors at intersections of the gate lines and the data lines; and
    forming pixel electrodes connected to the thin film transistors; and
    forming a color filter layer on the second substrate.

17. The method according to claim 11, further comprising:
    forming a plurality of gate lines and data lines on the first substrate;
    forming thin film transistors at intersections of the gate lines and the data lines;
    forming a color filter layer on the thin film transistors; and
    forming pixel electrodes connected to the thin film transistors.

18. The method according to claim 11, further comprising:
    forming a color filter layer on the first substrate;
    forming a plurality of gate lines and data lines on the color filter layer;
    forming thin film transistors at intersections of the gate lines and the data lines; and
    forming pixel electrodes connected to the thin film transistors.

19. A liquid crystal display device, comprising:
    first and second substrates;
    an active area on the first substrate including a plurality of gate lines and data lines, switching devices at intersections of the gate lines and the data lines, and pixel electrodes connected to the switching devices;

an orientation film on at least the active area, the orientation film having projecting edge portions extending at least in part beyond an outer contour of an active area;

at least one seal material regularly-spaced along the outer contour of the orientation film; and a liquid crystal layer between the first and second substrates.

20. The liquid crystal display device according to claim 19, wherein the at least one seal material includes projecting edge portions adjacent to the projecting edge portions of the orientation film.

21. The liquid crystal display device according to claim 19, further comprising a color filter layer on the second substrate.

* * * * *